J. P. CHRISTENSEN.
DUMPING WAGON.
APPLICATION FILED APR. 13, 1911.

1,113,409.

Patented Oct. 13, 1914.
5 SHEETS—SHEET 1.

WITNESSES:

INVENTOR:
John P. Christensen,
BY
Fraentzel and Richards,
ATTORNEYS

J. P. CHRISTENSEN.
DUMPING WAGON.
APPLICATION FILED APR. 13, 1911.

1,113,409.

Patented Oct. 13, 1914.
5 SHEETS—SHEET 3.

WITNESSES:
Fred'k H. W. Fraentzel
Harry E. Pfeiffer

INVENTOR:
John P. Christensen,
BY Fraentzel and Richards,
ATTORNEYS

J. P. CHRISTENSEN.
DUMPING WAGON.
APPLICATION FILED APR. 13, 1911.

1,113,409.

Patented Oct. 13, 1914.
5 SHEETS—SHEET 4.

WITNESSES:

INVENTOR:
John P. Christensen,
BY
Fraentzel and Richards,
ATTORNEYS

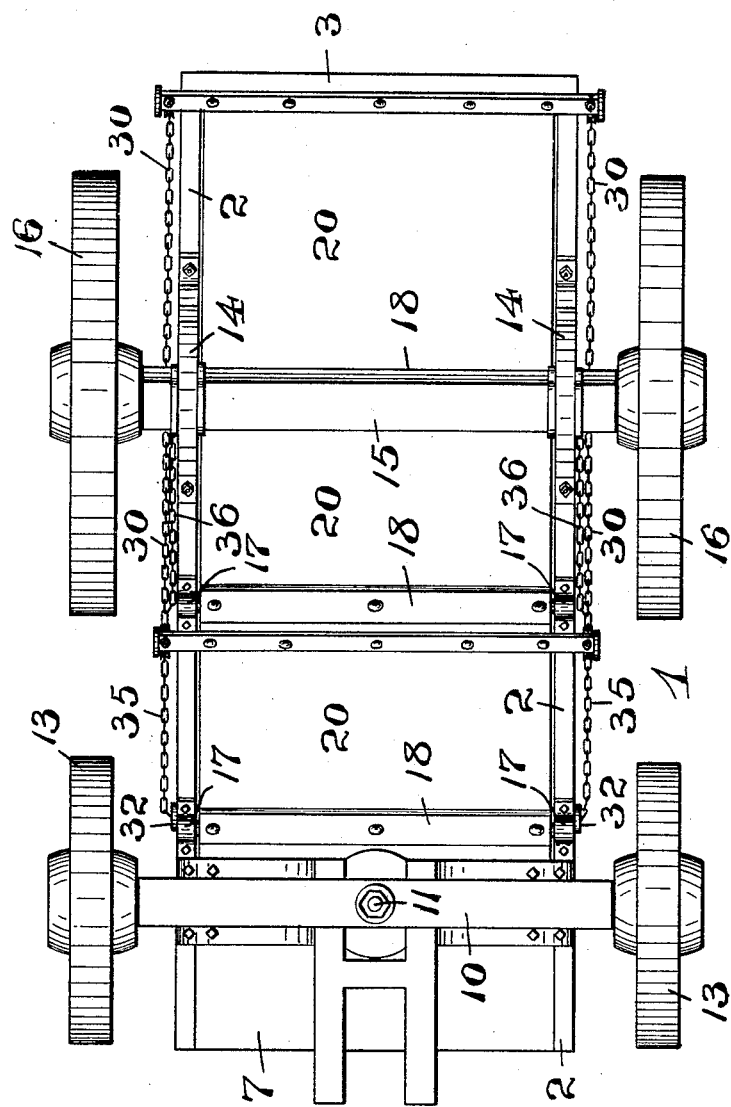

UNITED STATES PATENT OFFICE.

JOHN P. CHRISTENSEN, OF NEWARK, NEW JERSEY.

DUMPING-WAGON.

1,113,409.  Specification of Letters Patent.  Patented Oct. 13, 1914.

Application filed April 13, 1911. Serial No. 620,730.

*To all whom it may concern:*

Be it known that I, JOHN P. CHRISTENSEN, a citizen of the United States, residing at Newark, in the county of Essex and State of New Jersey, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in dumping wagons; and, the invention relates, more particularly, to a novel form and construction of dumping wagon, in which the bottom of the wagon is inclined toward the rear end of the vehicle, and comprises a number of hinged or pivoted bottom-sections or members which extend laterally across the bottom of the wagon, the vehicle being provided with mechanism which when released will allow the said bottom-sections to swing into their opened relations, for dumping the contents of the vehicle, and all of which bottom-sections can be simultaneously closed by operating the said above-mentioned releasing mechanism.

The invention consists, primarily, in the novel dumping wagon hereinafter set forth; and, the invention consists, furthermore, in the novel arrangements and combinations of the various devices and parts, as well as in the details of the construction of the same, all of which will be hereinafter more fully described, and then finally embodied in the clauses of the claim which are appended to and which form an essential part of this specification.

The invention is clearly illustrated in the accompanying drawings, in which:—

Figure 1:
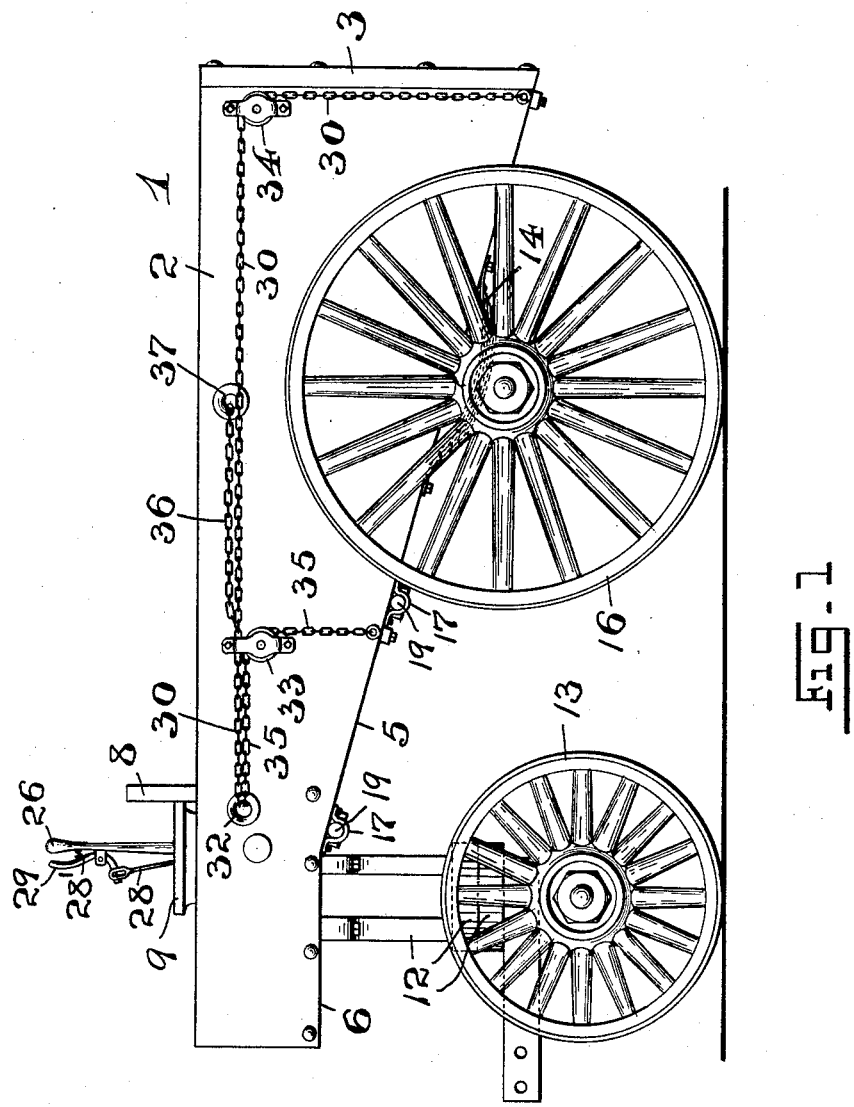
Figure 2:
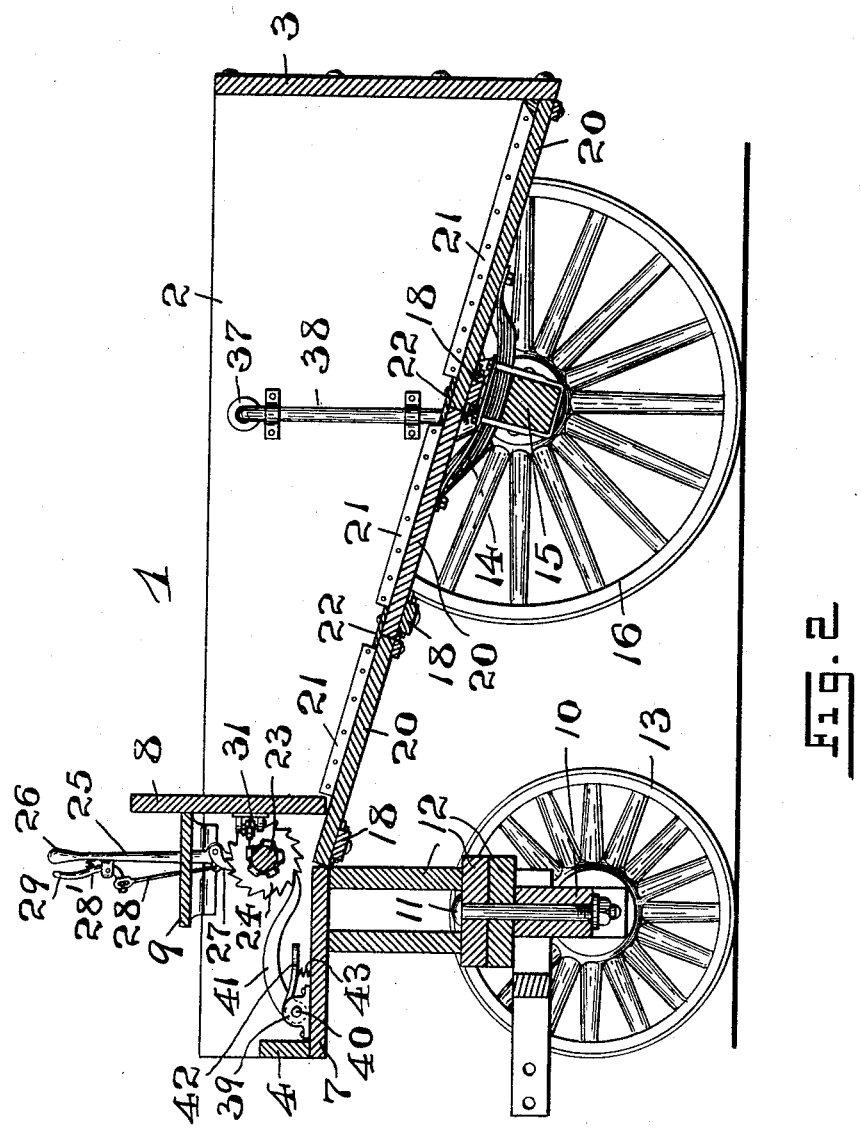
Figure 3:
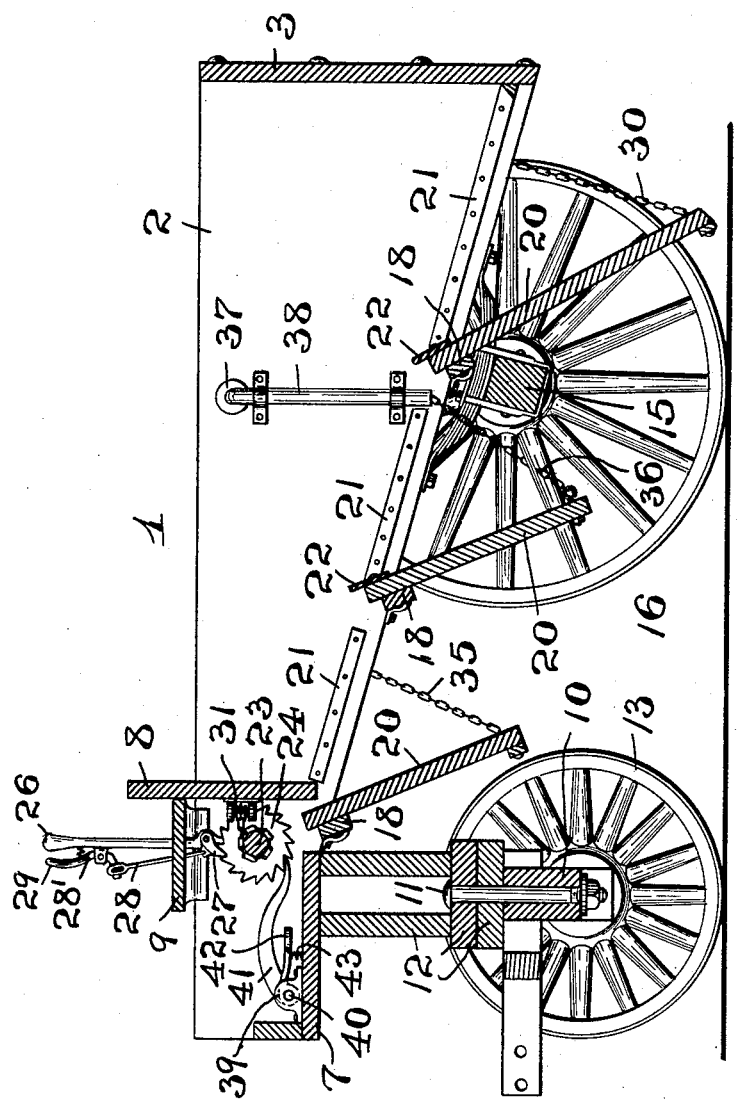
Figure 4:
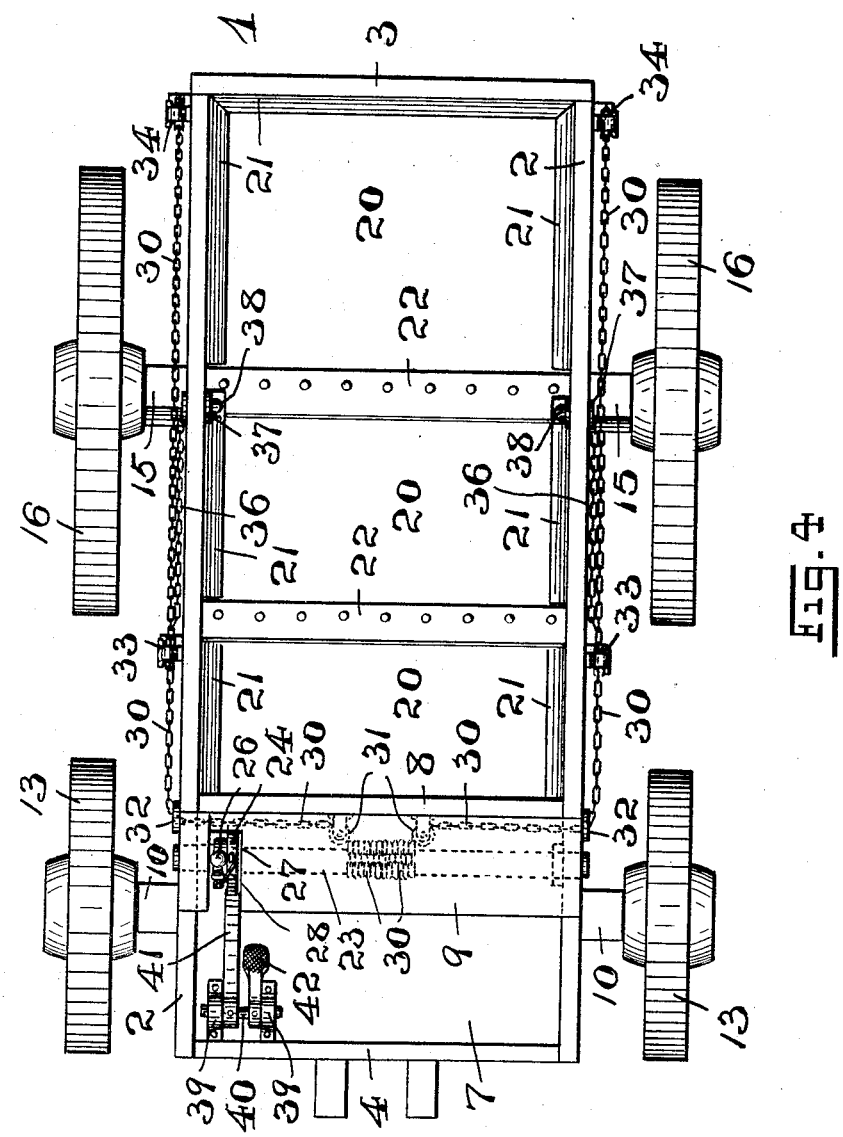

Figure 1 is a side elevation of a dumping wagon made according to and embodying the principles of the present invention; Fig. 2 is a longitudinal vertical section of the same, the laterally extending bottom-sections being shown in their closed relation; and Fig. 3 is a similar sectional representation of the vehicle, with the laterally extending bottom-sections being represented in their opened relation. Fig. 4 is a top or plan view of the dumping-wagon; and Fig. 5 is a bottom view of the same.

Similar characters of reference are employed in all of the above described views, to indicate corresponding parts.

Referring now to the several figures of the drawings, the reference-character 1 indicates a complete dumping wagon showing one embodiment of the principles of the present invention, the vehicle comprising a body consisting of two longitudinally extending members 2, forming the sides of said body, and an end-member or tail-piece 3, said sides being connected at the front end of said body by means of a cross-piece or member 4. The lower marginal edge-portions 6 near the front ends of said members or sides 2 for a short distance are parallel to the upper and horizontally disposed marginal edges of said members or sides 2, the remaining portions of said lower marginal edges of the said members or sides 2 extending rearwardly of the body of the vehicle and tapering downwardly, as at 5, in a manner represented in the several figures of the drawings.

The reference-character 7 indicates a short flooring at the front end of the body of the vehicle, the remaining bottom-part of said body, formed by the sides 2 and the end-member 3 being open, and the said open part of said body being separated from the boarded part of the body by means of a laterally extending board or partition 8, suitably secured at its ends to the said sides 2. Directly in front of this board or partition 8 is a suitably constructed seat 9.

The reference-character 10 indicates the front axle of the vehicle which is provided with a king-bolt 11, and is connected with the boarded part of the body of the vehicle by means of a structure 12, said axle having mounted thereon, the front wheels 13. Suitably secured upon the lower and rearwardly inclining edge-portions 5 of the sides 2 are suitable springs, as 14, to which is secured in any suitable manner a rear axle 15 having mounted thereon, the rear wheels 16. Also, suitably secured, at desirable points, upon said lower and rearwardly inclining edge-portions 5, are suitably constructed bearings 17 in which are journaled the journals 19 of laterally extending cross-bars or pieces 18, each cross-bar or piece 18 having connected therewith a gate 20, and a means connected with each gate for swinging or moving said gates in upward directions against suitable cleats or stops 21 which are secured upon the inner faces of the sides 2 of the body of the wagon, to close the open bottom of said body in the manner and for the purposes to be hereinafter more fully described.

In the accompanying drawings, the body of the wagon is shown with three of such swinging and laterally extending gates 20, but it will be clearly understood that more than three or only two of such laterally extending swinging gates may be employed, if desired.

As shown in Figs. 2, 3 and 4 of the drawings, the majority of said swinging gates are provided at their pivoted marginal edge-portions with laterally extending plates, as 22, which lap over said edges and upon the lower edge-portion of the next adjacent gate, when said gates have been brought into their closed relations, so as to fit directly over and close the joint formed by the adjacent gates when closed, and thereby providing a safeguard or protection of fine particles of sand, dirt, or the like, carted in the wagon from sifting out from the body of the wagon.

One means herein shown for simultaneously lowering and raising the said swinging and laterally extending gates 20 consists, essentially, of a shaft or rod 23 arranged above the boarded part of the body of the vehicle, said shaft or rod having its end-portions suitably journaled in bearing-portions in the sides 2, and being suitably disposed in front of the laterally extending board or partition 8. Suitably secured upon said shaft or rod 23 is a ratchet-wheel or disk 24, and loosely journaled upon the same shaft or rod is an upwardly extending lever 25 which is provided with a handle-portion 26, adapted to be grasped in the hand of the person seated upon the seat 9 for moving said lever 25 back and forth. Pivotally connected with the lower part of said lever 25 is a dog 27, said dog having its nosing normally in engagement with the teeth of said ratchet-wheel 24. The said dog can be disconnected or removed from its engaging relation with the ratchet-teeth of said wheel 24, by means of a link 28 which is pivotally connected at its lower end with the said dog 27, and is operatively connected at its upper end-portion with a suitably formed and spring-controlled bell-crank 28' which is provided with a suitably shaped handle-portion 29 located slightly in front of the handle-portion 26 of the lever 25, so as to be easily grasped for operating said bell-crank and the link 28, when necessary and for the purposes to be presently more fully described. These various devices and parts just described practically form a lifting or raising means, as will be clearly understood.

Suitably secured to the said shaft or rod 23, and adapted to be wound thereon, are chains or other flexible connections, as 30, two of such chains or flexible connections being used, as will be more clearly seen from an inspection of Figs. 4 and 5 of the drawings. These chains or flexible connections 30 pass laterally in opposite directions over suitable guides or grooved wheels, as 31, which are secured upon the front face of the board or partition 8, said chains or flexible connections extending through perforated fittings, as 32, suitably secured in the sides 2, and then passing rearwardly upon the outer surface of each side 2, through suitable guides and over grooved wheels 33 and 34, and downwardly at the rear end of each side 2, said chains or flexible connections being fastened at their rear ends to the last swing-gate, substantially as shown. Suitably secured to and connected with said chains or flexible connections 30, are two short sections of chains or flexible connections 35, said chains or flexible connections 35 passing through said perforated fittings 32 and over said grooved wheels 33, and then downwardly, said chains or flexible connections being suitably fastened to the swing-gate located nearest the said partition 8. In a like manner, there are secured to and connected with said chains or flexible connections 30, back of the grooved wheels 33, two other short sections of chains or flexible connections 36, said chains or flexible connections 36 passing through perforated fittings 37, suitably secured in the sides 2, and then passing downwardly through tubular elements, as 38, which are suitably secured upon the inner faces of the sides 2, said chains or flexible connections 36 extending from said tubular elements 38 and being suitably attached at their free ends to the middle swing-gate 20, as will be clearly evident from an inspection of the several figures of the drawings.

In order to retain all of the said gates into their raised or closed relations to the sides 2, so as to form a closed bottom for the body of the vehicle, there are secured upon the boarded portion of said body a pair of bearings 39 in which is oscillatorily mounted a short rod or spindle 40 upon which is mounted and secured a rearwardly extending dog 41, having its free end-portion normally in engagement with the teeth of the previously mentioned sprocket-wheel or disk 24. Upon the said rod or spindle 40 there is also mounted and secured a suitably formed foot-lever or treadle, as 42, beneath which is arranged and secured a spring 43, the purpose of which is to normally force the said treadle and the dog 41 in upward directions, so as to produce a positive holding engagement of said dog with the ratchet-wheel or disk 24. These last-mentioned devices, namely:—the said spindle 40, the said dog 41, and the said foot-lever or treadle 42, provide a suitable retaining mechanism for holding the several swing-gates in their raised and closed positions, which, however, can be actuated by the foot of the operator, simultaneously with the release, by the hand of the operator, of the first-mentioned dog 27 from its engagement with the ratchet-wheel or disk, for automatically opening or dropping all of the swing-gates to the positions illustrated in Fig. 3 of the drawings, to relieve the body of the wagon of its contents.

By removing the foot-pressure from the treadle, and the hand-pressure from the handle-portion 29 of the bell-crank 28', the parts of the lifting or raising means, and the parts of the retaining mechanism, will immediately assume their normal initial positions as represented in the several figures of the drawings, so that when the operator takes hold of the handle-portion 26 of the lever 25, and moves said lever 25 forwardly and backwardly in a reciprocatory manner, the chains or flexible connections attached thereto, cause the several swing-gates 20 all to be simultaneously operated and brought into their closed relations with the body of the wagon, as will be clearly evident.

I am fully aware that changes may be made in the arrangements and combinations of the various devices and parts, as well as in the details of the construction of the said parts, without departing from the scope of the present invention as set forth in the foregoing specification and as defined in the claim which is appended thereto. Hence, I do not limit my present invention to the exact arrangements and combinations of the various devices and parts as described in said specification, nor do I confine myself to the exact details of the construction of the said parts, as illustrated in the accompanying drawings.

I claim:

A dumping wagon comprising an open body, a rear axle provided with wheels, springs mounted on said rear-axle so as to support the rear end of said body, a series of laterally extending downwardly and rearwardly inclined swing-gates pivotally connected with said body to close the bottom of the same, a shaft within said body, flexible connections between said shaft and said swing-gates, means for winding part of said flexible connections upon said shaft for simultaneously closing said swing-gates, the flexible connections of one of the swing-gates passing through the sides of said body to connect with said swing-gate within said body so as to avoid the springs between said body and said rear-axle, and guard-coverings comprising tubular-members mounted upon the inner sides of said body to protect said flexible connections from contact with the contents of said body when loaded.

In testimony, that I claim the invention set forth above I have hereunto set my hand this 11th day of April, 1911.

JOHN P. CHRISTENSEN.

Witnesses:
FREDK. C. FRAENTZEL,
FREDK. H. W. FRAENTZEL.